INVENTORS.
AMOS J. SHALER
JOSEPH C. CONWAY
BY
Brown, Critchlow, Flick & Peckham
ATTORNEYS.

United States Patent Office 3,400,848
Patented Sept. 10, 1968

3,400,848
HULL STRUCTURE WITH HONEYCOMBED INTERIOR SURFACE FOR DEEP SUBMERGENCE VESSELS
Amos J. Shaler and Joseph C. Conway, State College, Pa., assignors to Pennsylvania State University, University Park, Pa.
Filed Feb. 2, 1967, Ser. No. 613,569
11 Claims. (Cl. 220—5)

ABSTRACT OF THE DISCLOSURE

A vessel for resisting high external fluid pressure having a smooth exterior and a honeycombed interior surface.

This invention relates to a hull structure having a honeycombed interior surface for vessels intended to be subjected to extremely high external fluid pressure, such as, for example, submergence vessels for exploring the ocean depths.

There are two basic problems in designing and fabricating the hulls of deep sea submergence vessels. One is to make the hull strong enough to resist the large crushing forces from hydrostatic pressure; and the other is to provide a sufficient reserve of positive buoyancy. Hulls can be made, for example, of steel or other metals, with walls thick enough to withstand the external pressures encountered in the deepest parts of the ocean; but the vessel is then so heavy that it sinks. To provide the positive buoyancy that is essential for free underwater navigation, such a hull must be attached to a flotation member, such as the petroleum filled envelope of a Trieste type submergence vessel, with resulting loss of maneuverability and increase in cost.

It is, accordingly, among the objects of the present invention to provide a hull structure for a deep submergence vessel that will have a relatively low weight for its displaced volume so as to be positively buoyant even when loaded, that will be capable of resisting hydrostatic pressures of the magnitude found at the deeper parts of the ocean without elastic instability or plastic yielding, and that will permit the use of high strength, low density shell materials, including reinforced carbons and graphites, glasses and ceramics, and fiber-reinforced polymers and metals, as well as conventional metals and their alloys.

The foregoing and other objects will be apparent from the following description of a preferred embodiment of the invention in connection with the attached drawings, in which.

Figure 1:
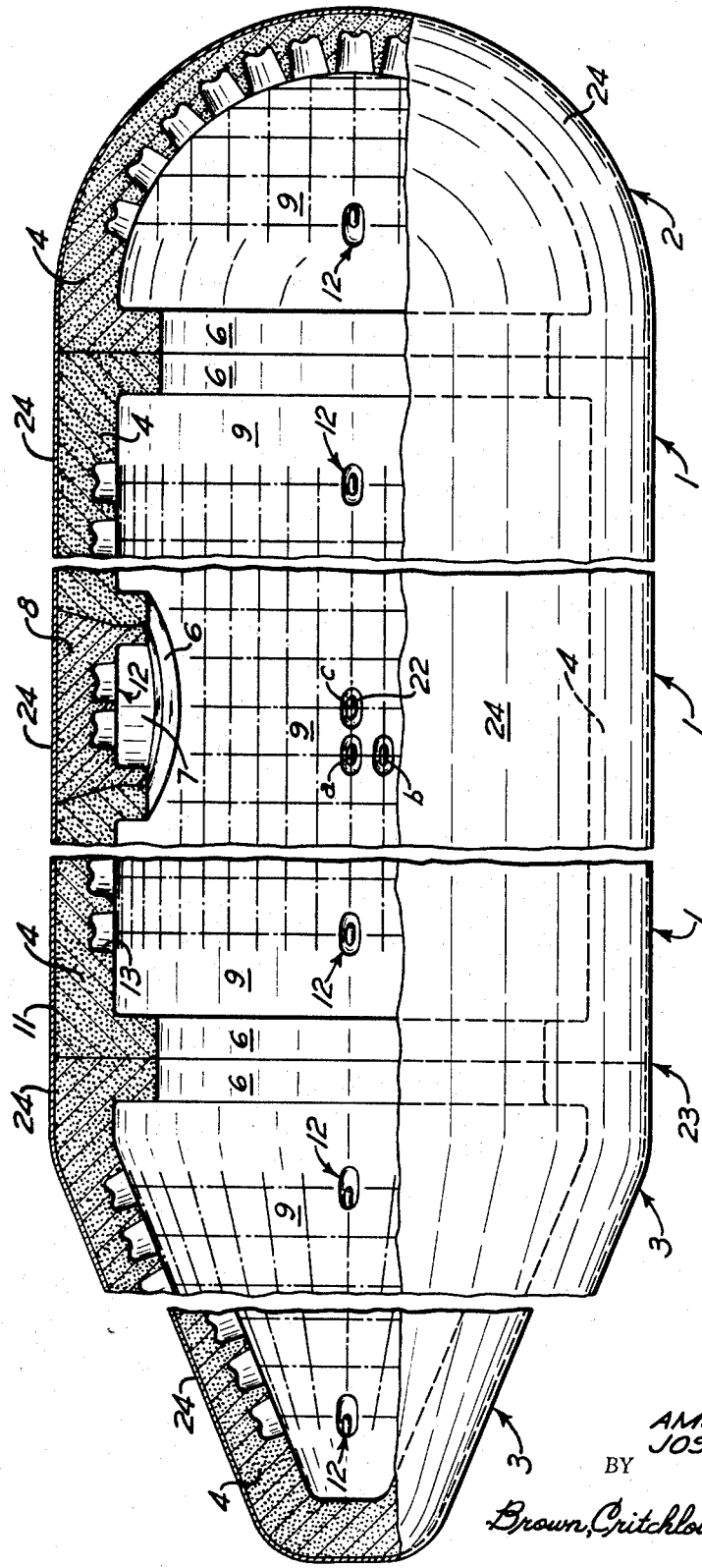
FIG. 1 represents, somewhat diagrammatically, a fragmentary vertical longitudinal section of a deep submergence vessel, showing a shell structure having a generally honeycombed interior surface.

The deep submergence vessel made in accordance with the present invention comprises a shell structure having an exterior surface that is generally smooth and an interior surface that is generally honeycombed. The honeycombed surface is formed by an array of laterally spaced recesses in the shell having a depth generally in excess of one-half the total thickness of the adjacent portion of the shell, except in regions of the shell adjacent interior reinforcing ribs (which may be provided, for example, around a hatch opening in the shell or at the boundaries of shell sections) where there may be no recesses or their depth may be diminished. Each recess has a side portion extending towards the bottom of the recess and a bottom that includes a central convex portion and a surrounding annular concave portion, the latter being substantially tangent both to the side portion and to the central convex portion. The depth of the recesses, their cross-sectional size and shape, and their spacing relative to each other are determined by the expected stresses in the adjacent portion of the shell and the proporties of the shell material.

Referring to the drawings, which have been simplified to emphasize the essential features of the invention, the deep sea vessel there shown has a composite shell structure of three or more longitudinal sections, consisting of one or more central cylindrical sections 1, a hemispherical bow section 2, and a conical stern section 3. Each section includes a shell 4 of substantially uniform thickness throughout the section, except for the integral internal annular ribs 6. The latter are desirably located adjacent the end of each section where it joins an adjacent section or is adjacent to a hatch opening 7 (which is closed by a removable hatch cover 8) in the central section. The various sections are secured together and the hatch cover held in place by suitable conventional means (not shown) that form no part of this invention.

The interior surface 9 of the vessel is generally honeycombed, while the exterior surface 11 is generally smooth and is preferably provided with a thin skin of impermeable ductile material as explained in more destail later herein. The honeycombing of the interior surface is provided by an array of recesses 12, which are distributed more or less uniformly as explained below. There are no recesses, however, in the reinforcing ribs 6 or in the immediately adjacent regions of the shell.

The recesses 12 preferably have cross sections that are elliptical (which, as used herein, includes superelliptical and other elliptical-like forms) in planes parallel to the adjacent interior surface of the shell; but these cross sections may take other geometric shapes, such as circles, squares, rectangles, regular or irregular polygons, or combinations of those shapes (the noncircular shapes preferably having rounded corners). The major diameter of each elliptical recess in the plane of the interior surface of the shell is preferably about one-half the total thickness of the adjacent shell, but may vary with different materials; and the minor diameter is about one-half the major diameter. Preferably, the major axes of these ellipses extend generally longitudinally of the shell. The depth of each recess is roughly at least one-half of the total thickness of the adjacent shell, and may vary with the spacing of the recesses relative to each other in accordance with the conditions described below. The side wall 13 of each recess preferably tapers slightly inwardly, for example, at an angle of about 5° relative to the axis of the recess, which not only permits the recesses to be moulded in the shell but also increases the resistance of the shell to failure. The bottom 14 of the recess includes a central convex portion 16, which may be a portion of an ellipsoid (which, as used herein, includes superellipsoid and other ellipsoid-like forms) having major and minor diameters equal, for example, to those of the recesses in the plane of the interior surface of the shell, the ellipsoid projecting beyond the bottom about one-twentieth of its major diameter. This central convex portion is surrounded by an annular concave portion 17 that is tangent both to the convex portion and to the adjacent side wall. The advantages of the rounded bottom contours described above are that they avoid local concentrations of stress and provide additional wall material at the center of the bottom where the stresses are greatest, thereby preventing the development, otherwise probable, of undesired tensile stresses in the outside surface of the shell over an elliptical area that roughly corresponds to the sidewall projection of the adjacent recess. In general, the curvature of the convex portion of the bottom of each recess is the greater, the smaller the elastic modulus and the density of the shell material. Also, in order that the limits of resistance of the shell shall be substantially equal in both the yielding and elastic collapse modes, the recesses are made deeper if the ratio of compressive strength to elastic modulus of the material is greater, and also if the density of the shell material is greater.

The recesses 12 are distributed over the entire interior surface of the shell, except in ribs 6 and in annular zones 18 immediately adjacent those ribs where maximum strength and rigidity are desired because of the bending moments involved. The width of each recess-free zone 18 is approximately one-sixth or less of the distance between adjacent ribs. Immediately adjacent each of these zones 18 (on the side thereof remote from the adjacent rib) is an annular transition zone 19; this, in turn, merges into an annular normal zone 21, which forms the central zone of each central section. In each of the zones 19 and 21, the recesses are distributed in a generally rectangular configuration, as indicated by the lines $ab$ and $ac$ joining the centers 22 of certain recess openings at the interior surface of the shell (see FIG. 1). Alternatively, the recesses may be arranged in a triangular configuration in which the lines joining the centers of three vertically adjacent recesses would form preferably isosceles triangles.

Figure 2:
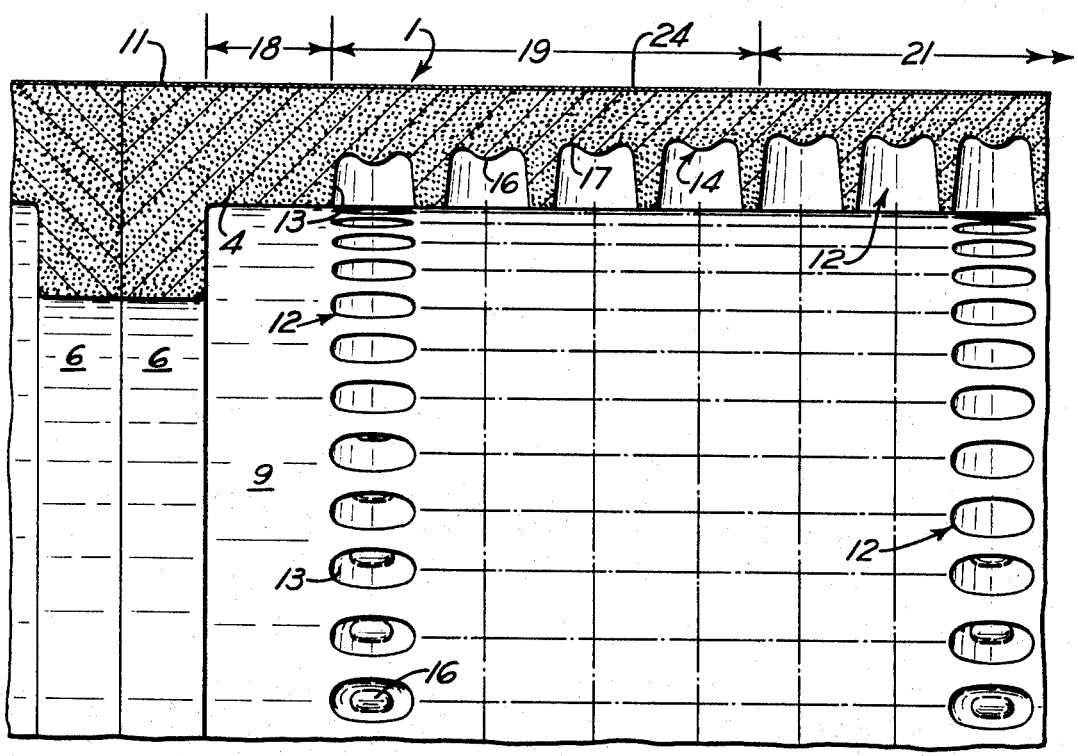
FIG. 2 is an enlarged fragmentary view of a central cylindrical portion of the hull, part of which is shown in FIG. 1.
Figure 3:
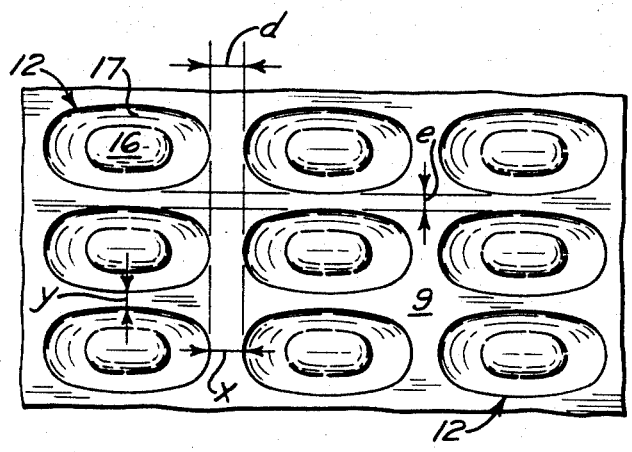
FIG. 3 is a developed, and still further enlarged, view of a portion of FIG. 2.
Figure 4:
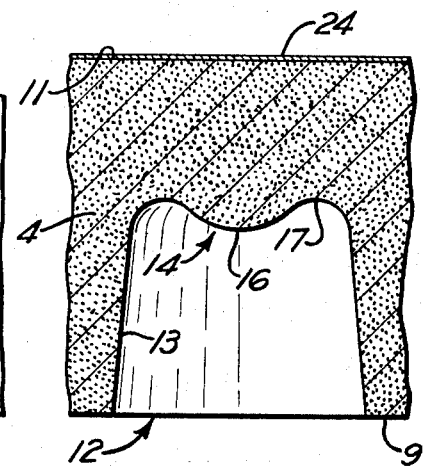
FIG. 4 is a section along the line IV—IV of FIG. 3.

In each transition zone 19, the recesses are spaced more closely in a circumferential direction than in a longitudinal direction, with the inequality becoming less towards the adjacent normal zone 21, reflecting the unequal stresses in those directions. For example, as shown in FIG. 3, the longitudinal spacing $x$ between adjacent recesses in the transition zone 19 is shown as approximately three times the circumferential spacing $y$ for those recesses that are nearest the recess-free zone 18, whereas this ratio decreases to about 2 to 1 where the transition zone merges into the adjacent normal zone 21. Likewise, in each of the transition zones 19, the depth of the recesses gradually increases in a direction away from the adjacent recess-free zone 18 towards the adjacent normal zone 21, varying from approximately two-thirds to three-quarters of the depth prevailing in the latter (see FIG. 2). In each normal zone 21, the recesses are more nearly equally spaced, so that the ratios of the distances $x$ and $y$ are nearly as 2 is to 1, substantially reflecting the ratio of the circumferential and longitudinal stresses, respectively, on the shell in that region. In this connection, the unrecessed portions of the recessed zones may be considered as forming annular circumferential ribs of width $d$ and longitudinal ribs of width $e$ (see FIG. 3), the former being generally wider because the circumferential stresses are generally greater. The foregoing spacing ratio ($x$:$y$) may, however, be made smaller than indicated above, in fact less than unity, for vessels intended for submergence to very great depths.

Although the shell wall may be made of any suitable high-strength material, such as the common and exotic metals and their alloys, it is preferably made of high-strength, low density materials, which may be nonmetallic, as, for example, modified carbons or graphite, glasses or ceramics. If the material is initially porous, as is the case with most carbons, graphites, and ceramics, the pores may or may not be filled with another material to obtain the optimum combination of specific stiffness and specific strength according with the stability, yield, and fracture limits of the particular shell structure. For example, the shell material may be a modified carbon with a particular porosity and pore size distribution, the pores being either empty or filled in accordance with known methods by infiltration with a polymer, a salt, a ceramic, a metal, other material, or a combination of these, preferably as compatible as possible with the base material with respect to its coefficient of thermal expansion and its chemical and elastic properties, so that the final specific stiffness and specific strength at points of yielding and buckling failure are at a maximum and occur simultaneously when the external hydrostatic pressure is raised sufficiently to cause failure. One advantage of using a carbon-base material modified in this manner is that the recesses may be formed in the material by isostatic pressing while in the "green carbon" state or can be machined in later, whereas these operations are difficult or impossible to perform in glass and ceramic materials. After being formed to the desired shape, the green carbon may be baked (and, if necessary, machined) and then modified by infiltration as described above and, if desired, heat treated to improve its properties.

In ribbed-shell structures, at the outer surface of the shell, along circles whose planes lie just outside the planes containing the sides of the ribs (for example, at the point indicated by the arrow 23 in FIG. 1), a tensile stress component is generated in the longitudinal direction, when the shell is subjected to intense external fluid pressure. Failure may then occur at such places, particularly if there is a flaw (such as a microcrack or inclusion) present in the surface to nucleate a crack. To prevent such failure, and to give the material other advantages, the exterior surface of a shell in which the base material is inherently brittle (as for example, when made of a glass, a ceramic, or a carbon-base material), is provided with a tightly adherent skin 24 of a ductile metal or polymer. Preferably, this skin is under a residual biaxial stress sufficient to counter the tensile stress just described. This skin need not be more than a few thousandths of an inch thick to decrease greatly the likelihood of tensile failure; but it may be much thicker if it is desired for other purposes as well. Such a ductile skin will also protect the base material against accidental scratches or impacts; and additionally, in case an unfilled porous base material is used for the shell structure, it provides impermeability. The skin may also function to resist corrosion, thus relieving the base material of the necessity of providing its own corrosion resistance. This skin may be formed, for example, by nickel tetra-carbonyl vapor deposition, by bis-cyclopentadienyl titanium dichloride vapor deposition, or by similar depositions. Such depositions generally involve heating the shell to a temperature suitable to dissociate the vapor that is brought in contact with the exterior surface of the shell for a period long enough to produce the desired skin thickness, for example, as disclosed in United States patent to Norman et al., No. 3,157,531. Upon cooling, the differences in thermal contraction between the metal skin and the base material automatically generate the desired residual stress in the skin.

We claim:

1. A vessel for resisting high external fluid pressure, comprising an enclosed load-bearing shell having a generally smooth exterior surface and a generally honeycombed interior surface, said honeycombed surface being in the form of an array of laterally spaced recesses having a maximum depth of at least one-half the total thickness of the adjacent shell wall, each recess having a side portion extending towards the bottom of the recess and having a bottom portion that includes a central convex portion and a surrounding annular concave portion, the latter portion being substantially tangent both to the side portion and the central convex portion.

2. Apparatus according to claim 1, in which the recesses have a substantially elliptical cross section in planes substantially parallel to the adjacent surface of the shell.

3. Apparatus according to claim 1, in which the sides of the recesses taper inwardly towards the bottoms of the recesses.

4. Apparatus according to claim 1, in which the shell is made of a porous modified carbon material and is formed with recesses therein by isostatic pressing followed by baking of the pressed material.

5. Apparatus according to claim 1, in which the exterior surface of the shell is provided with a tightly adherent thin skin of a ductile material.

6. Apparatus according to claim 5, in which said ductile skin is a nickel foil formed by the dissociation of nickel-carbonyl vapor applied to the exterior surface of the shell.

7. Apparatus according to claim 5, in which the ductile skin is a titanium foil formed by the dissociation of bis-cyclopentadienyl titanium dichloride vapor applied to the exterior surface of the shell.

8. Apparatus according to claim 1, in which the shell includes a plurality of joined cylindrical sections, each of which is provided with an interior annular reinforcing rib adjacent each edge of the section.

9. Apparatus according to claim 8, in which each cylindrical section has a recessed surface divided into a plurality of zones, including a normal zone in which the recesses have a substantially uniform depth and spacing and a transition zone, disposed between the normal zone and a reinforcing rib, in which the depth of the recesses decreases in a direction away from the normal zone and in which the spacing between recesses increases in the same direction.

10. Apparatus according to claim 9, in which the longitudinal spacing of the recesses is approximately twice their circumferential spacing in the normal zone and approaches three times their circumferential spacing in that part of the transition zone most remote from the normal zone.

11. Apparatus according to claim 9, in which the transition zone lies between an adjacent normal zone and an unrecessed zone, the last zone being adjacent a reinforcing rib and having a longitudinal dimension of between one-fourth and one-sixth of the distance between adjacent ribs of that section.

References Cited

UNITED STATES PATENTS

| | | | |
|---|---|---|---|
| 3,167,204 | 1/1965 | Rouse | 114—16 X |
| 3,280,775 | 10/1966 | Krenzke | 114—16 |

FERGUS S. MIDDLETON, *Primary Examiner.*

T. M. BLIX, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,400,848                  September 10, 1968

Amos J. Shaler et al.

It is certified that error appears in the above identified patent and that said Letters Patent are hereby corrected as shown below:

In the heading to the printed specification, lines 6 and 7, "assignors to Pennsylvania State University, University Park, Pa." should read -- said Shaler assignor to Stackpole Carbon Comp St. Marys, Pa. and said Conway assignor to Pennsylvania State University, University Park, Pa. --.

Signed and sealed this 27th day of January 1970.

(SEAL)
Attest:

Edward M. Fletcher, Jr.                  WILLIAM E. SCHUYLER, JR.

Attesting Officer                         Commissioner of Patents